United States Patent
Frank et al.

(10) Patent No.: US 7,012,513 B2
(45) Date of Patent: Mar. 14, 2006

(54) METHOD AND DEVICE FOR DYNAMIC SETTING OF A VEHICLE COMPONENT

(75) Inventors: Peter Frank, Stuttgart (DE); Klaus-Peter Kuhn, Pluederhausen (DE); Andreas Proettel, Leutenbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/729,371

(22) Filed: Dec. 8, 2003

(65) Prior Publication Data

US 2004/0167678 A1 Aug. 26, 2004

Related U.S. Application Data

(63) Continuation of application No. PCT/EP02/03100, filed on Mar. 20, 2002.

(30) Foreign Application Priority Data

Jun. 7, 2001 (DE) ................................. 101 27 619

(51) Int. Cl.
*B60Q 1/00* (2006.01)
(52) U.S. Cl. ...................... 340/439; 340/438; 180/271; 180/272; 280/5.501; 280/5.502
(58) Field of Classification Search ................ 340/438, 340/439–441; 280/5.501, 5.503; 180/271–272, 180/282
See application file for complete search history.

(56) References Cited

U.S. PATENT DOCUMENTS

| | | | | |
|---|---|---|---|---|
| 5,032,997 A | * | 7/1991 | Kawagoe | 701/48 |
| 5,632,503 A | | 5/1997 | Raad et al. | |
| 6,643,578 B1 | * | 11/2003 | Levine | 701/70 |
| 2001/0004723 A1 | * | 6/2001 | Nishiyama | 701/79 |

FOREIGN PATENT DOCUMENTS

| | | |
|---|---|---|
| DE | 39 16 460 C2 | 11/1990 |
| DE | 3016480 C2 | 11/1990 |
| DE | 44 19 317 A1 | 12/1994 |
| DE | 4419317 A1 | 12/1994 |
| DE | 198 60 248 C1 | 12/1998 |
| DE | 19860248 C1 | 12/1998 |

* cited by examiner

*Primary Examiner*—Julie Bichngoc Lieu
(74) *Attorney, Agent, or Firm*—Crowell & Moring LLP

(57) ABSTRACT

In a method for dynamically adjusting a vehicle component, a characteristic variable which influences the behavior of the vehicle component can be varied automatically or manually while traveling. A state variable which characterizes the behavior of the driver is first determined directly after a change in the characteristic variable, and the determined state variable is then compared with a setpoint variable. The change in the characteristic variable of the vehicle component is at least partially reversed if the state variable exceeds the setpoint variable.

12 Claims, 2 Drawing Sheets

METHOD AND DEVICE FOR DYNAMIC SETTING OF A VEHICLE COMPONENT

CROSS-REFERENCE TO RELATED APPLICATIONS

This application is a continuation of PCT Application No. PCT/EP02/03100, filed Mar. 20, 2002).

BACKGROUND AND SUMMARY OF THE INVENTION

This application claims the priority of German patent document 101 27 619.2, filed 7 Jun. 2001, the disclosure of which is expressly incorporated by reference herein.

The present invention relates to a method and apparatus for dynamically adjusting a vehicle component.

German patent document DE 39 16 460 C2 discloses a method for controlling the chassis of a passenger vehicle or utility vehicle, in which an actuator between the vehicle body and the wheels can be set by means of actuation signals of a controller as a function of measurement signals that determine the vertical dynamics and/or lateral dynamics of the vehicle. Depending on the vehicle state at a given time, different controller parameters can be predefined, with different possibilities for adjustment between a comfort-orientated and a driving-safety-orientated vehicle behavior. If critical travel states occur (which can be detected, for example, by the longitudinal and lateral forces exerted at the tires, a changeover into a safety-orientated configuration of the controller parameters takes place.

In this method there is the risk that, when the controller parameters change automatically, the driver may be surprised by the changed travel behavior of the vehicle, and a hazardous situation results, due to the driver's overreaction.

German patent document DE 44 19 317 A1 discloses a vehicle longitudinal control system in which the extent of experience of the vehicle driver is estimated and classified by a neuronal network based on current vehicle measured values, and controller parameters are adapted as a function of the determined driving experience. The supporting steering reaction torque is reduced if the driver of the vehicle is experienced, and is increased if the driver of the vehicle is inexperienced.

In a system described in German patent document DE 44 19 317 A1, the driving behavior of the driver is influenced by increasing or reducing the steering support as a function of estimated driving experience. Although it is possible in this way to compensate for excessive reactions by inexperienced drivers which affect the steering movement directly, it is not possible to compensate for further overreactions of the driver.

One object of the invention is to increase driving safety in vehicles with dynamic adjustment of at least one vehicle component by means of which the driving behavior can be influenced.

This and other objects and advantages are achieved by the method and apparatus according to the invention, in which a vehicle state variable that characterizes the driving behavior of the vehicle operator (for example, the steering angle or variables which are correlated therewith, such as the steering angle speed) is determined directly after a change in a characteristic variable that determines the behavior of the vehicle component. This state variable which characterizes the driving behavior is compared with a predefined setpoint variable. If the state variable exceeds the setpoint variable, the change in the vehicle component is at least partially reversed.

In contrast to the prior art, in the method according to the invention, the cause of an overreaction by the driver (namely a change in the behavior of a vehicle component) is addressed directly by reversing at least partially such a change into the original state, or at least an attenuated state. It is thus not necessary in all cases to change the steering behavior of the vehicle, which changes are usually felt to be particularly serious by the driver, and may in turn be the cause of undesired and dangerous driver reactions. Instead, the cause itself of the excessive driver reaction is at least partially compensated by readjustment at the respective vehicle component using attenuated controller parameters or ones which have been reversed to the original state.

The state variable which can be influenced by the driver is examined over a predefined time period directly after a change in the vehicle component or the characteristic variable of the vehicle component. In particular the amplitude, frequency and/or degree of attenuation of the state variable is determined within the time period under consideration, and at least one of these variables is compared with an assigned setpoint variable. It may be expedient, for example, to determine the number of oscillations whose amplitude exceeds a minimum value within the time period under consideration, and to reverse the change in the characteristic variable of the vehicle component if the number of oscillations exceeds a setpoint value. For example, if the steering angle is the state variable that is to be examined and can be influenced by the driver, this technique means that abrupt steering movements of the driver (in which the steering is deflected in one direction, followed by compensating counter movements in the opposite direction) are used to decide whether to reverse the change in the characteristic variable in the respective vehicle component. The change is reversed if the driver repeatedly carries out successive steering movements whose amplitude lies above a limiting value.

In addition (or alternatively) to the consideration of steering angle (or variables which are correlated therewith), lateral acceleration of the vehicle may also be determined and used as the basis to decide whether to maintain or reverse the implemented change or switching over of the characteristic variable of the component.

If the result of the evaluation is that a reversal of the change is recommended, such reversal can take place in a plurality of incremental steps, with the change being reversed at first only partially, and a greater reversal taking place from step to step. In a first step, the duration of the switchover phase, within which the characteristic variable of the vehicle component is changed, is advantageously prolonged so that, rather than an abrupt change, a continuous change takes place, which enables the driver to become accustomed to the change.

If it is determined in a renewed measurement and calculation cycle that, despite the reversal implemented in the first step, the driver reaction is still above the permitted degree, it is possible, in a second step, to reduce the permitted variation range for the change in the respective characteristic variables so that the behavior of the vehicle is modified only to a relatively small degree in comparison with the original state. The second step is advantageously compared with the first step.

If it is detected in a further measurement and calculation cycle that the driver reactions still lie outside the permitted setpoint range, it is possible, in a third step, for the change in the characteristic variable to be completely reversed and for the characteristic variable to be frozen at its original value. The third step is also advantageously combined with the preceding step, possibly with the two preceding steps.

If the characteristic variable has been held at the current set, reset value for a minimum time period, the characteristic value can be switched over manually or automatically again or the value of the characteristic variable which was valid before the last switchover operation is set again.

The vehicle component characteristic value which is to be influenced can either be a parameter of the component in question or a state variable. Thus, if the vehicle component is a spring element it may be expedient to vary the spring rate as parameter, whereas the spring travel is influenced as a state variable, which can be brought about, for example by replacing the spring by an actively driven actuator.

The device according to the invention for dynamically adjusting a vehicle component, whose characteristic variable can be changed automatically or manually while traveling by acting on it via an actuator element, comprises a control unit that generates actuation signals which are fed to the actuator element to set the vehicle component, in accordance with a stored calculation rule, based on measurement signals of the vehicle which are determined by means of sensors.

One of the measurement signals corresponds to a vehicle state variable which represents the behavior of the driver. A comparison unit of the control unit compares this measurement signal with a given setpoint variable, and an actuation signal, which is to be fed to the actuator element and with which the change in the characteristic variable of the vehicle component is at least partially reversed, is generated if the measurement signal exceeds the setpoint variable.

The vehicle component which influences the driving behavior of the vehicle maybe, for example, vehicle brake, a power steering system, the engine controller, the drive train controller and/or the spring/damper system in the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
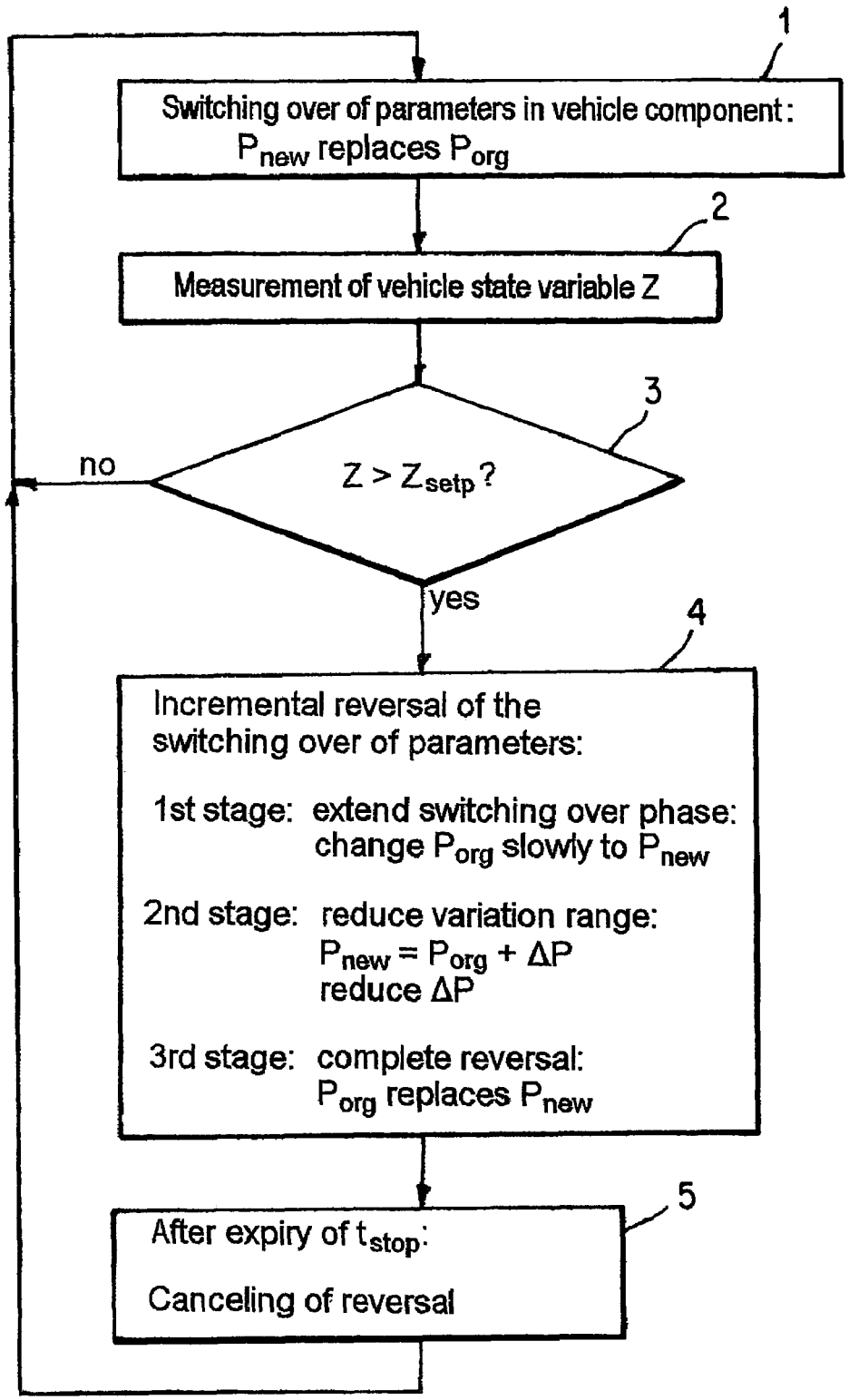
FIG. 1 is a flow chart which shows the individual steps of the method according to the invention.

Referring to FIG. 1, according to step 1, a specific parameter of a vehicle component is switched over from an original value $P_{org}$ to a new value $P_{new}$ either manually by the driver or automatically on the basis of changed external conditions. The switching over takes place, for example, by acting on the vehicle component by means of an actuator element, as a result of which the driving behavior of this vehicle component changes. The adjustment by means of the actuator element can be carried out, for example, in a control unit by means of stored characteristic variables or the calculation of actuation signals.

In the following step 2, a vehicle state variable Z, which characterizes the driving behavior of the driver of the vehicle, is determined, especially by measuring, but if appropriate also by means of mathematical determination from a measurement variable. In particular the steering angle or a variable which correlates therewith maybe determined as such state variables; however, if appropriate, in addition or alternatively the lateral acceleration of the vehicle or some other variable whose profile permits conclusions to be drawn about the driving behavior of the driver of the vehicle is also possible.

In the following step 3, it is determined in the control unit of the system whether the measured vehicle state variable Z exceeds an assigned setpoint variable $Z_{setp}$. If not, it is possible to conclude that the switching over of the parameters from $P_{org}$ to $P_{new}$ does not result in a negative change in the driving behavior of the driver of the vehicle. Accordingly, the system returns to the start of the method in accordance with the No branch.

If the measured vehicle state variable Z exceeds the assigned setpoint value $Z_{setp}$, it is possible to conclude that there is an overreaction of the driver of the vehicle which can lead to dangerous driving situations. In this case, the method proceeds, in accordance with the yes branch, to step 4 in which an at least incremental reversal of the switching over of the parameters is carried out.

The interrogation according to step 3 can be run through cyclically at regular intervals in order to have permanent control over the driving behavior of the driver of a vehicle. In step 3, in particular the vehicle state variable Z which is measured over a minimum time period is examined. For this purpose, the characteristic variables of the oscillation profile of the vehicle state variable Z (in particular the amplitude, the frequency and the degree of attenuation within the time period under consideration) are expediently determined. If one or more of these parameters lies above assigned setpoint variables $Z_{setp}$ in step 3, it is possible to assume an overreaction by the driver. For example, the number of oscillations whose amplitude exceeds a minimum value are determined. If such number exceeds a permitted limiting value, the condition according to step 3 is met, and the system proceeds to step 4 in which the switching over of the parameters is reversed incrementally.

As illustrated in step 4, the reversal of the switching over of the parameters takes place advantageously in three increments. In a first increment, the duration of the switchover phase is firstly prolonged so that the change in the determining parameter by means of which the behavior of the vehicle component is decisively determined occurs more slowly from $P_{org}$ to $P_{new}$ than was firstly carried out in step 1. The speed of change of the parameter is reduced so that the driver of the vehicle is provided with a longer period of time in which he can accustom himself to the changed driving behavior.

During the switchover phase, and also chronologically after the switchover phase according to the first stage, the vehicle state variable Z is measured permanently at cyclical intervals and it is checked whether the assigned setpoint value $Z_{setp}$ is exceeded. If it is detected that the setpoint value is still exceeded during the switchover phase or after the switchover phase of the first stage, the system advances to the second stage according to which the permitted variation range for the parameter is reduced. The variation range can be characterized by $\Delta P$ which is added to the original parameter value $P_{org}$ so that the new parameter value $P_{new}$ is calculated according to the relationship $$P_{new} = P_{org} + \Delta P$$

The variation range $\Delta P$ is reduced in comparison with a basic setting in the second stage so that a smaller change in the parameter is carried out than is the case in the basic setting. The vehicle state variable Z is also continuously measured during and after the second stage and checking is performed to determine whether the setpoint value is exceeded.

If, despite the reduction in the second stage, it is still detected that said variable is exceeded, the system proceeds to the third stage in which the switching over of the parameters is completely reversed and the current value of the switching over $P_{new}$ of the parameters is set to the original value $P_{org}$ which characterizes the basic setting of this parameter.

Chronologically after the first, second and third stages, the system waits, according to the following step 5, for a stop time $t_{Stop}$ in which the vehicle state variable Z is measured and checked to determine whether the setpoint variable $Z_{setp}$ is exceeded within $t_{Stop}$. If not, the reversal of the switching over of the parameters which is carried out in step 4 is cancelled again after the expiration of the stop time $t_{Stop}$ and the current parameter value is set to the value set before the reversal. This is then returned to step 1 after this.

Figure 2:
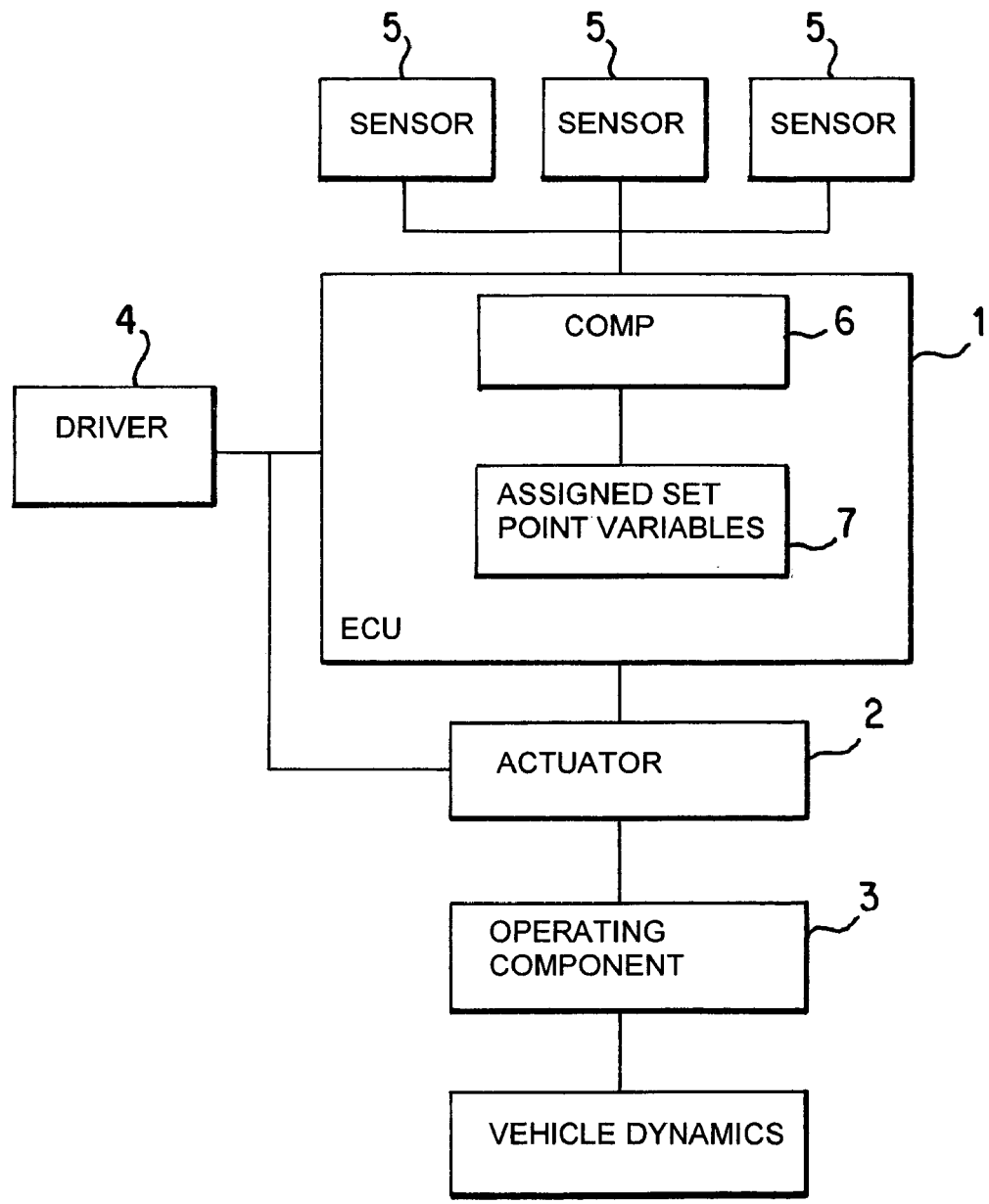
FIG. 2 is a schematic diagram of a system for implementing the method shown in FIG. 1.

A system for implementing the method according to the invention is depicted in FIG. 2, which shows a control unit 1 which controls an actuator element 2 that operates a component 3 of the vehicle control system, such as the brakes, power steering, engine operation, drive train operation or the suspension system. Operation of the component 3 in turns affects the dynamic response of the vehicle, which is detected by the vehicle operator 4 and may or may not cause him or her to overreact. A plurality of sensors 5 are provided to detect any change in a characteristic variable that influences the behavior of the vehicle component, and provides that information to the control unit 1, which includes a comparator 6 that compares the driver's response to a stored set of assigned setpoint variables to determine whether to reverse the change of the setpoint variable in the manner described previously.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for dynamically adjusting a vehicle component which affects operation of the vehicle, and whose behavior is influenced by a characteristic control variable, said device comprising:
   means for automatically or manually changing the characteristic control variable while traveling, via an actuator element;
   a control unit which adjusts said actuator element in response to a change of said characteristic control variable, via actuation signals in accordance with a stored calculation rule; and
   sensors for supplying measurement signals to said control unit for generating said actuation signals; wherein,
   a measurement signal which corresponds to a vehicle state variable that reflects behavior of a vehicle operator is determined over a predefined time period;
   at least one response characteristic value that characterizes an oscillation profile of measured vehicle state variables is determined and compared in a comparison unit of the control unit with an assigned setpoint value to determine whether the vehicle operator adapts to the change in the behavior of the vehicle component which results from a change in the characteristic control variable of the vehicle component;
   an actuation signal, which is fed to the actuator element and which at least partially reverses the change in the characteristic control variable of the vehicle component, is generated, if the driver does not adapt to the change in the behavior of the vehicle component; and
   whether the driver adapts to the change in behavior is determined by whether that at least one response characteristic value of the oscillation profile exceeds the assigned setpoint values.

2. The device according to claim 1, wherein the vehicle component which influences the driving behavior is one of a vehicle brake, a power steering system, a drive chain controller and a spring/damper system in the vehicle.

3. A method for controlling operation of a vehicle having at least one component whose output affects vehicle dynamics in response to a characteristic control variable, said method comprising:
   detecting a manually or automatically generated change in said characteristic control variable, which change causes a change of said vehicle dynamics;
   in response to said change of the characteristic control variable, measuring a vehicle state variable that characterizes a response of an operator of the vehicle to said change of vehicle dynamics;
   evaluating said measured vehicle state variable to determine whether said operator adapts to said change in vehicle dynamics; and
   reversing, at least partially, said change of the characteristic control variable if the driver does not adapt to the change in vehicle dynamics;
   wherein whether said operator adapts to the change of vehicle dynamics is determined by whether at least one oscillation parameter of said measured vehicle state variable exceeds a preset threshold value.

4. A method for dynamically adjusting a component of a vehicle, in which a characteristic control variable that influences behavior of the vehicle component can be varied automatically or manually while traveling, said method comprising:
   determining a vehicle state variable that indicates the behavior of the driver, over a predefined time period directly after a change in the characteristic control variable of the vehicle component;
   determining at least one response characteristic value that characterizes an oscillation profile of the vehicle state variable within a time period under consideration;
   comparing the determined at least one response characteristic value with an assigned setpoint value in order to determine whether the driver adapts to a change in the behavior of the vehicle component which results from the change in the characteristic control variable of the vehicle component; and
   reversing at least partially the change in the characteristic control variable of the vehicle component if the driver does not adapt to the change in the behavior of the vehicle component;
   wherein, whether the driver adapts to the change in behavior is indicated by whether one of the at least one response characteristic value of the oscillation profile exceeds the assigned setpoint value.

5. The method according to claim 4, wherein at least one of vehicle steering angle and vehicle lateral acceleration is determined as a vehicle state variable which is influenced by the behavior of the driver.

6. The method as claimed in claim 4, wherein one of amplitude, frequency and a degree of attenuation of the vehicle state variable which is influenced by the driver is determined, and used as said response characteristic value for the comparison with an assigned setpoint value.

7. The method according to claim 6, wherein a change in the characteristic control variable of the vehicle component is reversed if the number of oscillations whose amplitude exceeds a minimum value is larger than a predefined setpoint number of oscillations.

8. The method according to claim 4, wherein:
reversal of a change in the characteristic control variable of the vehicle component takes place in a plurality of increments;
after each reversal, the at least one response characteristic value that characterizes the oscillation profile of the vehicle state variable is determined and compared with the setpoint value assigned to it; and
when the setpoint value is exceeded or undershot a further reversal is carried out.

9. The method according to claim 8, wherein in a first stage of the reversal, the switchover phase for changing the characteristic control variable is chronologically prolonged.

10. The method according to claim 8, wherein in a second stage of the reversal, a variation range within which the change in the characteristic control variable is permitted is reduced.

11. The method according to claim 8, wherein in a third stage of the reversal, the characteristic control variable is set to a standard value which corresponds to a series adjustment.

12. The method according to claim 4, wherein after expiration of a predefined time period:
the reversal is cancelled; and
the characteristic control variable is set to the value present before the reversal.

\* \* \* \* \*